(12) United States Patent
Collier-Hallman et al.

(10) Patent No.: US 8,498,781 B2
(45) Date of Patent: Jul. 30, 2013

(54) METHODS AND MOTOR COMPUTER PROGRAM PRODUCTS FOR MOTOR CONTROL BY THE IMPLEMENTATION OF DAMPING FOR OVER-SPEED CONDITIONS

(76) Inventors: Steven J. Collier-Hallman, Frankenmuth, MI (US); Julie A. Kleinau, Bay City, MI (US)

( * ) Notice: Subject to any disclaimer, the term of this patent is extended or adjusted under 35 U.S.C. 154(b) by 1246 days.

(21) Appl. No.: 11/869,847

(22) Filed: Oct. 10, 2007

(65) Prior Publication Data

US 2008/0167776 A1    Jul. 10, 2008

Related U.S. Application Data

(60) Provisional application No. 60/878,976, filed on Jan. 5, 2007.

(51) Int. Cl.
*B62D 6/00* (2006.01)

(52) U.S. Cl.
USPC .............................. 701/41; 701/42; 180/446

(58) Field of Classification Search
USPC .................... 180/422, 446; 318/400.01, 432, 318/434, 139; 701/41, 42, 43
See application file for complete search history.

(56) References Cited

U.S. PATENT DOCUMENTS

| | | | | |
|---|---|---|---|---|
| 4,538,698 A | * | 9/1985 | Hashimoto et al. | 180/446 |
| 4,621,327 A | * | 11/1986 | Dolph et al. | 701/43 |
| 4,735,271 A | * | 4/1988 | Shimizu | 180/446 |
| 4,945,298 A | * | 7/1990 | Nakashima | 318/635 |
| 4,947,949 A | * | 8/1990 | Morishita et al. | 180/446 |
| 4,957,181 A | * | 9/1990 | Oshita et al. | 180/446 |
| 4,980,624 A | * | 12/1990 | Bernhardt | 318/434 |
| 4,984,647 A | * | 1/1991 | Morishita et al. | 180/446 |
| 5,444,622 A | * | 8/1995 | Takeshima et al. | 701/41 |
| 5,513,058 A | * | 4/1996 | Hollenbeck | 361/36 |
| 5,596,252 A | * | 1/1997 | Shimizu et al. | 318/432 |
| 5,668,722 A | * | 9/1997 | Kaufmann et al. | 701/41 |
| 6,617,811 B2 | * | 9/2003 | Schafert | 318/139 |
| 2002/0179363 A1 | * | 12/2002 | Takatsuka et al. | 180/446 |
| 2003/0039473 A1 | * | 2/2003 | Zhang et al. | 388/806 |
| 2005/0043873 A1 | * | 2/2005 | Mir et al. | 701/41 |

* cited by examiner

*Primary Examiner* — Khoi Tran
*Assistant Examiner* — Stephen Holwerda
(74) *Attorney, Agent, or Firm* — Cantor Colburn LLP

(57) ABSTRACT

A method for controlling the response of an electric steering system by implementing damping for over-speed conditions is disclosed. The method includes the step of determining the velocity of an electric motor within the electric steering system, and determining a voltage limit value, wherein the voltage limit value is calculated as a function of the velocity of the electric motor. The method further includes the step of associating the voltage limit value with a motor voltage command in order to produce a limited voltage command, and applying the limited voltage command to the motor in order to provide a braking torque to the motor.

13 Claims, 2 Drawing Sheets

METHODS AND MOTOR COMPUTER PROGRAM PRODUCTS FOR MOTOR CONTROL BY THE IMPLEMENTATION OF DAMPING FOR OVER-SPEED CONDITIONS

CROSS REFERENCE TO RELATED APPLICATION

The subject matter of this application is related to the subject matter of U.S. Provisional Application Ser. No. 60/878,976, filed Jan. 5, 2007, assigned or under obligation of assignment to the same entity as this application, from which application priority is claimed, and which application is incorporated by reference.

BACKGROUND OF THE INVENTION

This invention relates to electrical power assisted steering systems, and particularly to control systems that are configured to induce damping in over-speed conditions.

DESCRIPTION OF BACKGROUND

Conventionally, within current electric steering systems, the speed/torque characteristics of the motors implemented within steering systems are designed to meet customer requirements in addition to minimizing cost. Control of the speed/torque characteristics within the steering systems are accomplished via the manipulation of a selection of steering system motor parameters in addition to an "envelope" function comprised within the steering system controller. In the event that a driver steers a vehicle with a steering velocity that is greater than a determined envelope limit, the torque of the motor is deregulated until it becomes approximately zero. In certain vehicles, a decrease of motor torque can be perceived by a driver as a feeling resembling that of the shutting down of the power assist features of the steering system; the feeling thus producing an uncomfortable experience for the driver. In reality, the feeling produced by the decreasing motor torque is partly due to the actuality that the damping of the steering system is very low in the instance that the motor velocity exceeds a velocity wherein the envelope function regulates the torque of the steering system to zero. In addition to this issue, the driver has the possibility of attaining very high hand-wheel velocities that are not helpful in steering assist operations.

One possible solution to the above-mentioned problem is to extend the controller envelope function below the speed axis in order to include negative torques. However, this solution can be difficult to implement due to a high sensitivity to further implemented control parameters in addition to the potential of the conduction very large currents through the controller. Therefore, there exists a need to implement a motor control methodology that will provide damping functionality in the event of a steering over-speed condition.

SUMMARY OF THE INVENTION

Disclosed herein is a method for controlling the response of an electric steering system by implementing damping for over-speed conditions, the method comprising determining the velocity of an electric motor comprised within the electric steering system and determining a voltage limit value, wherein the voltage limit value is calculated as a function of the velocity of the electric motor. The method further comprises retrieving a motor voltage command, determining a limited voltage command, and applying the limited voltage command to the motor in order to provide a braking torque to the motor.

Yet further disclosed herein is a method for controlling the response of an electric steering system by implementing damping for over-speed conditions comprising calculating a voltage limit value for a tuning set, calculating a modulation index, determining a modulation index limit, and determining a minimum modulation index value. The method further comprises applying the sign of the calculated modulation index to the determined minimum modulation index value, determining a limited modulation index command value, utilizing the limited modulation index command value to generate a control signal, and applying the control signal to the electric motor in order to generate a braking torque in the electric steering system.

The above-described and other features will be appreciated and understood by those skilled in the art from the following detailed description, drawings, and appended claims.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings that are meant to be exemplary, not limiting, in which:

The detailed description explains the exemplary embodiments of the invention, together with advantages and features, by way of example with reference to the drawings.

DETAILED DESCRIPTION OF THE INVENTION

One or more exemplary embodiments of the invention are described below in detail. The disclosed exemplary embodiments are intended to be illustrative only since numerous modifications and variations therein will be apparent to those of ordinary skill in the art. The terms "a" and "an" herein do not denote a limitation of quantity, but rather denote the presence of at least one of the referenced item.

Within conventional electric power assisted steering systems, a torque sensor is implemented to measure the level of torque that is being applied to a steering column. A controller utilizes this measurement to generate a control signal, wherein the control signal contains information indicating the torque that is to be generated by an electric motor, the electric motor being attached to the steering column. In operation, the electric motor supplies an assistance torque to the steering column, thus reducing the effort that a driver has to expend in order to turn the steering wheel.

Within aspects of the present invention, a method to control the response of the electronic steering motor when the driver exceeds the rated hand wheel velocity of the system is implemented. The effect of this control is realized by the progressive reduction of a motor terminal voltage to zero, when the speed of a motor exceeds a predetermined value. This operation effectively creates a smooth transition in the control of the motor from normal operations to a braking mode. The braking results of the operation are achieved because the operation of applying zero volts to a motor is similar in action to shorting the terminals of a steering motor. Thus, the resulting motor torque is a braking torque, wherein the braking torque is calculated and determined by a motor constant, a motor resistance, a motor inductance, and a motor velocity.

Once the motor voltage is reduced to zero the further implemented control parameters of the motor have no effect on the system and the battery current that is attributed to the motor is zero. Further, the motor current within the motor is limited due to the inductive reactance of the motor. This present control method changes previous operating paradigms from that of controlling a motor torque as a function of speed to an operating paradigm that facilitates the transitioning of the motor control to an operational control mode that comprises a damping effect and a manageable current, in addition to an inherent insensitivity to the control and operating parameters of an electronic steering system.

Figure 1:
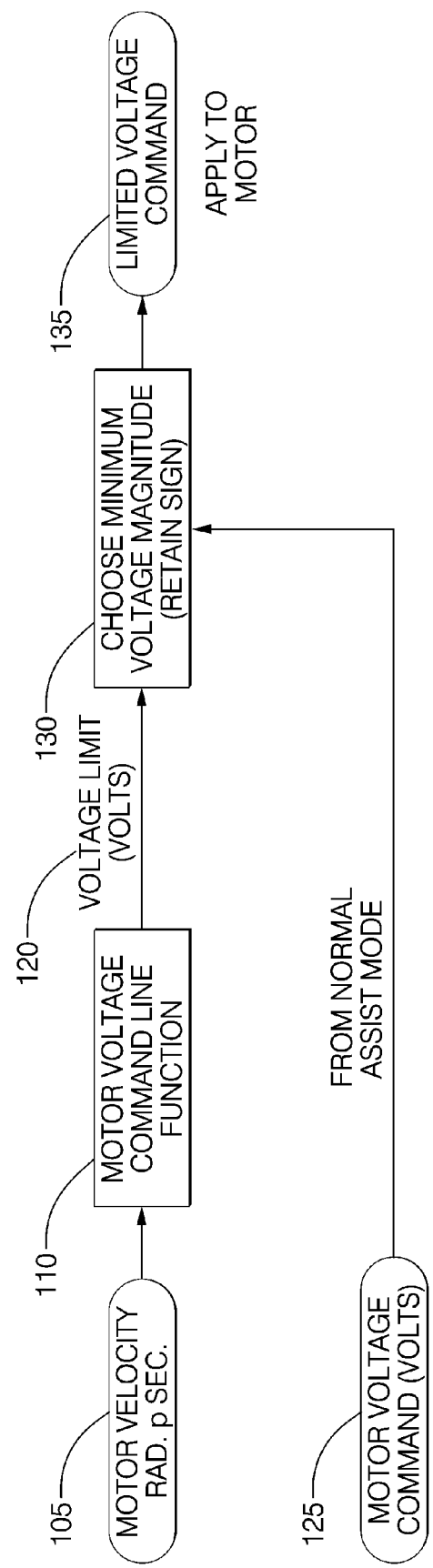
FIG. 1 is a flow diagram detailing aspects of an embodiment for the generation of a limited voltage command.

FIG. 1 shows a diagram illustrating aspects of an embodiment for carrying out the methodologies of the present invention. As presently disclosed, a motor voltage command envelope limit function is a novel calibration function that can be used to smoothly decrease an allowable motor voltage command with motor speed in the event that the motor speed of a motor exceeds a defined no load speed of operation. The result of this operation is to allow the motor to provide a braking torque when motor speed exceeds a no-load speed, the no-load speed referring to the speed above which the torque command is essentially registered as zero.

Within aspects of the present invention, the motor voltage command limit function is defined as a mathematical function. The prescribed mathematical function determines a maximum allowed motor voltage command limit as a function of motor speed. Further, this mathematical function is a monotonically decreasing function of motor speed wherein the function is mirrored to account for negative motor velocity. The motor voltage command limit function may be implemented as a lookup table, an equation, a set of piecewise equations, or any other conventional means for the implementation of such a function. The motor command voltage limit function can also be implemented using any one of a number of well-known analog circuits (e.g., such as operational amplifiers).

Within yet further aspects of the present invention the motor voltage command envelope is configured to reside within a tuning set. A tuning set is essentially a grouping calibration values that are used to manage different vehicle build combinations. Using this grouping method, each calibration is duplicated N times where N represents the number of tuning sets in addition to the number of vehicle build combinations. Each tuning set contains a copy of each relevant calibration parameter and table, with the values of each parameter and table appropriately set for the specified vehicle build combination. For example, a tuning set number 1 will contain all of the relevant calibrations for a vehicle build combination number 1.

As shown in FIG. 1, the motor voltage command limit function 110 has a motor velocity 105 (measured in rad/sec) as its input and a voltage limit 120 (measured in volts) as its output. At 130, the voltage limit 120 is compared to a motor voltage command 125 (that is also measured in volts), wherein the minimum voltage value of the two is determined and associated with a limited voltage command 135. The limited voltage command 135 is thereafter applied to a motor in order to provide a braking torque to the motor.

Figure 2:
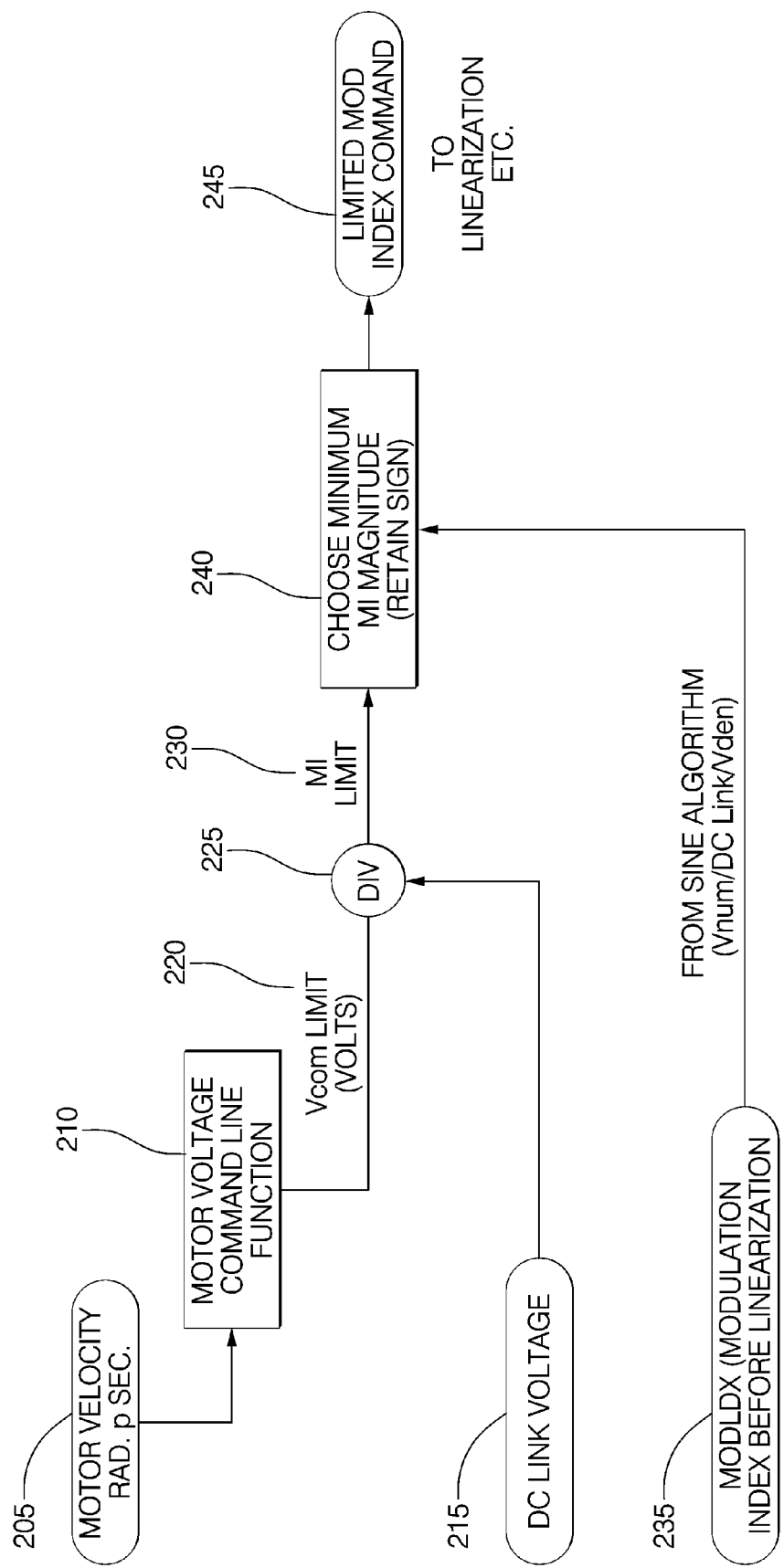
FIG. 2 is a flow diagram detailing aspects of an embodiment for the generation of a limited modulation index command.

FIG. 2 shows a diagram illustrating yet further aspects of an embodiment for carrying out the methodologies of the present invention. As shown in FIG. 2, the independent variable for the motor velocity 205 is determined and input to a motor voltage command limit table 210. Thereafter, the dependent variable for the maximum voltage limit command value 220, as measured in volts, is calculated. Once the voltage command 220 is obtained, the voltage command 220 is divided by 225 (DIV) by the DC link voltage value 215 in order to calculate a modulation index limit 230 (MI limit). A Sine algorithm is used to calculate a modulation index 235. Thereafter, the MI limit 230 is compared to the calculated magnitude of the modulation index 235, wherein the minimum value of the two values is used to determine a limited modulation index value 240. The sign from the calculated modulation index 235 is applied to the limited modulation index value 240, and the limited modulation index command 245 is passed to a further control processing function (e.g., a linearization function or a similar function).

Within aspects of the present invention, the voltage limit value 220 resolution must be of a sufficient value so that after dividing the voltage limit value 220 by the DC link voltage 215, the changes in the MI Limit 230 variable are of a reasonably smooth nature. It must further be noted that if the voltage command 220 is initially calculated, and then the modulation index 235, the new MI limit 230 could be applied before the modulation index 235 calculation. However, for optimal scaling purposes, with further aspects of the present invention, the modulation index 235 is calculated by determining the voltage command 220 numerator. Next, the voltage command 220 is divided by the DC link voltage 215, and then divided the voltage command 220 denominator in order to obtain the modulation index 235. The new voltage command limit function, which is defined in units of volts, must also be converted to modulation index units before applying the limit.

The capabilities of the present invention can be implemented in software, firmware, hardware or some combination thereof. The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the invention disclosure has been described with reference to an exemplary embodiment, it will be understood by those skilled in the art that various changes may be made and equivalents may be substituted for elements thereof without departing from the scope of the invention disclosure. In addition, many modifications may be made to adapt a particular situation or material to the teachings of the invention disclosure without departing from the essential scope thereof. Therefore, it is intended that the invention disclosure not be limited to the particular embodiment disclosed as the best mode contemplated for carrying out this invention disclosure, but that the invention disclosure will include all embodiments falling within the scope of the appended claims.

What is claimed is:

1. A method for controlling the response of an electric steering system by implementing damping for over-speed conditions, the method comprising:
   determining the velocity of an electric motor comprised within the electric steering system;
   determining a voltage limit value, wherein the voltage limit value is calculated as a function of the velocity of the electric motor;
   retrieving a motor voltage command;
   determining a limited voltage command with a controller, wherein the limited voltage command is a minimum voltage value of a magnitude of the voltage limit value and the motor voltage command; and applying the limited voltage command to the motor to provide a braking torque to the motor, the braking torque comprising supplying a voltage of about zero volts to the motor in response to the electric steering system exceeding a rated hand wheel velocity.

2. The method of claim 1, further comprising comparing the magnitudes of the voltage limit value and the motor voltage command.

3. The method of claim 1, wherein the voltage limit value is a monotonically decreasing function of the velocity of the electric motor.

4. A method for controlling the response of an electric steering system by implementing damping for over-speed conditions, the method comprising:

receiving the velocity of an electric motor;

calculating a voltage limit value with a controller, the voltage limit value based on the velocity of the electric motor;

dividing the voltage limit value by a DC link voltage in order to obtain a modulation index limit with the controller;

receiving a modulation index;

calculating a minimum modulation index value by comparing the modulation index limit with a magnitude of the modulation index, the minimum of the modulation index limit and the modulation index being the minimum modulation index value;

applying a sign of the modulation index to the minimum modulation index value with the controller;

utilizing a limited modulation index command value to generate a control signal, the limited modulation index command value based on the minimum modulation index value; and applying the control signal to the electric motor to generate a braking torque in the electric steering system, the braking torque comprising supplying a voltage of about zero volts to the motor in response to the electric steering system exceeding a rated hand wheel velocity.

5. The method of claim 4, wherein a sine algorithm calculates the modulation index.

6. The method of claim 4, wherein the limited modulation index command value is determined by applying a linearization function to the minimum modulation index value.

7. The method of claim 6, wherein the control signal is configured to control the transition of the electric motor from a normal operational mode to a braking mode.

8. The method of claim 4, wherein the voltage limit value is a monotonically decreasing function of the velocity of the electric motor.

9. A computer program product that includes a non-transitory computer readable medium useable by a processor, the medium having stored thereon a sequence of instructions which, when executed by the processor, causes the processor to control the response of an electric steering system by implementing damping for over-speed conditions by:

receiving the velocity of an electric motor;

calculating a voltage limit value, the voltage limit value based on the velocity of the electric motor;

dividing the calculated voltage limit value by a DC link voltage in order to obtain a modulation index limit;

receiving a modulation index;

calculating a minimum modulation index value by comparing the modulation index limit with a magnitude of the modulation index, the minimum of the modulation index limit and the modulation index being the minimum modulation index value;

applying a sign of the modulation index to the minimum modulation index value;

determining a limited modulation index command value, the limited modulation index command value based on the minimum modulation index value;

utilizing the limited modulation index command value to generate a control signal; and applying the control signal to the electric motor in order to generate a braking torque in the electric steering system, the braking torque comprising supplying a voltage of about zero volts to the motor in response to the electric steering system exceeding a rated hand wheel velocity.

10. The computer program product of claim 9, wherein a sine algorithm calculates the modulation index.

11. The computer program product of claim 9, wherein the limited modulation index command value is determined by applying a linearization function to the minimum modulation index value.

12. The computer program product of claim 11, wherein the control signal is configured to control the transition of the electric motor from a normal operational mode to a braking mode.

13. The computer program product of claim 9, wherein the voltage limit value is a monotonically decreasing function of the velocity of the electric motor.

\* \* \* \* \*